United States Patent [19]

Guild

[11] 3,754,434
[45] Aug. 28, 1973

[54] CHEMICAL ANALYSIS
[75] Inventor: Lloyd V. Guild, Bethel Park, Pa.
[73] Assignee: Scientific Kit Corporation, Inc., Pittsburgh, Pa.
[22] Filed: Feb. 22, 1971
[21] Appl. No.: 117,646

[52] U.S. Cl.............................. 73/61.1 R, 73/422 GC
[51] Int. Cl....................... G01n 1/10, G01n 31/08
[58] Field of Search............ 73/61.1 R, 53, 422 GC, 73/423 A

[56] References Cited
UNITED STATES PATENTS

| | | | |
|---|---|---|---|
| 3,550,453 | 12/1970 | Lightner et al................ | 73/422 GC |
| 3,302,452 | 2/1967 | Leslie.......................... | 73/423 A UX |
| 3,096,653 | 7/1963 | Martin et al. ................. | 73/422 GC |
| 3,529,475 | 9/1970 | Lightner et al. ............... | 73/423 A |

Primary Examiner—Richard C. Queisser
Assistant Examiner—Joseph W. Roskos
Attorney—Hymen Diamond

[57] ABSTRACT

There is disclosed a method, apparatus, and parts such as a sample holder and a pipette for automatic chemical analysis of a plurality of samples by use of a chromatograph or the like. The samples are in unique sample holders which are advanced along a gravity conveyor, each in its turn being set in a test position. At the test position an entrance self-sealable septum of the sample holder is punctured by a hypodermic pipette having a sample-receiving chamber which is at reduced pressure. When the pipette enters the holder the sample is sucked into the chamber. Then the pipette punctures an exit self-sealable septum and enters the testing means, for example, the chromatograph. There the sample is rapidly evaporated from the pipette and the vapor analyzed. The pipette is then withdrawn from the holder and the residue of sample in the holder reduced. The conveyor is advanced one step so that a new sample holder is in the test position. This new holder is held and then the first sample holder is discharged from the conveyor.

18 Claims, 16 Drawing Figures

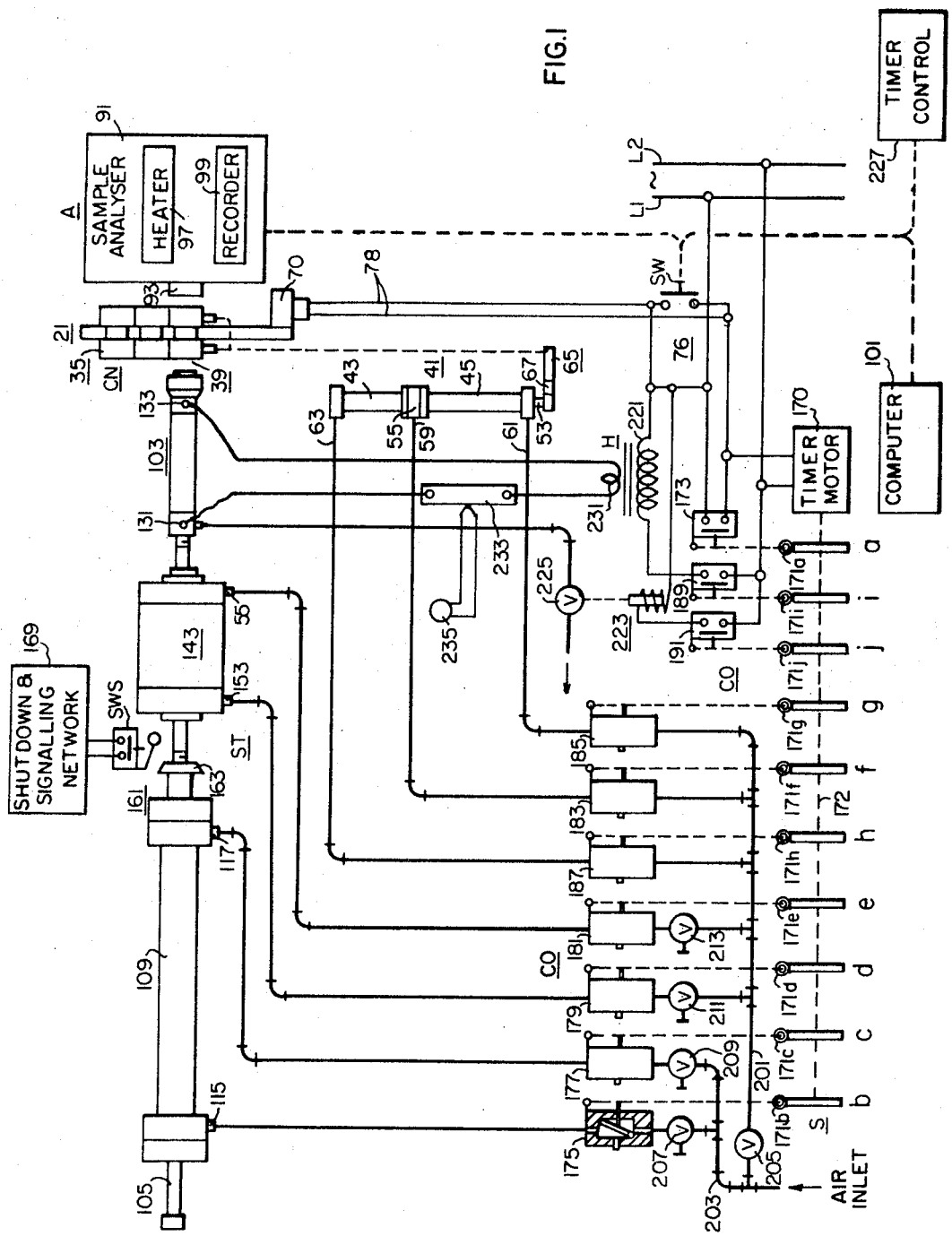

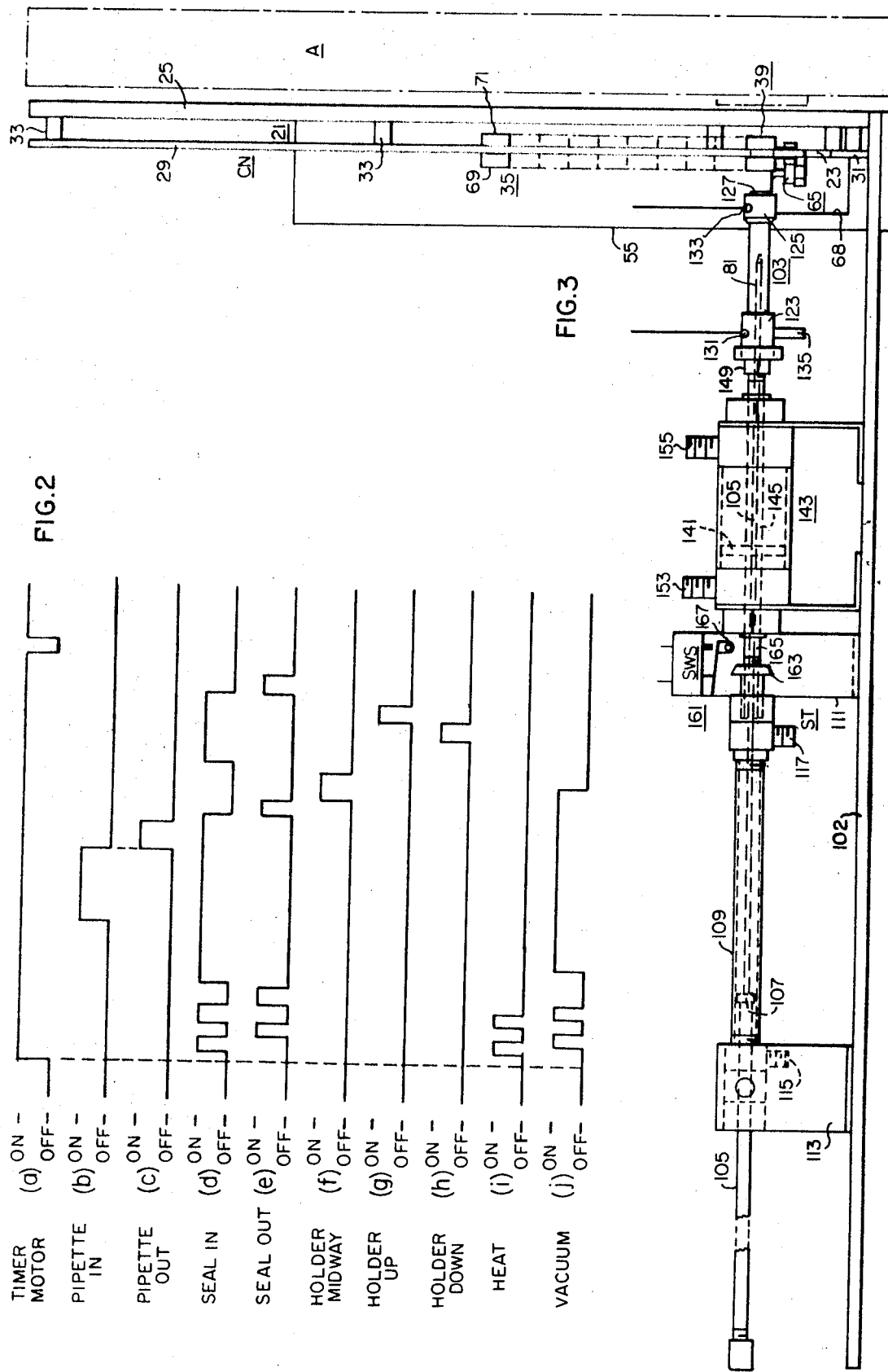

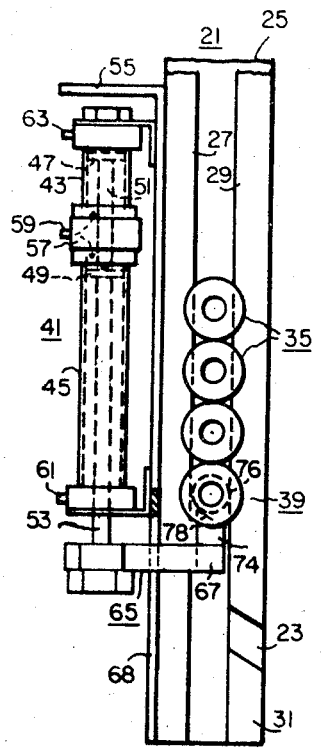
FIG.4a
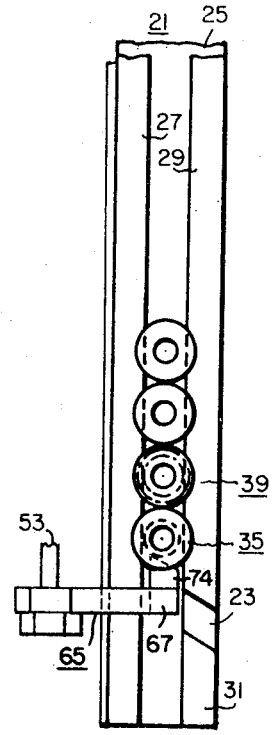
FIG.4b
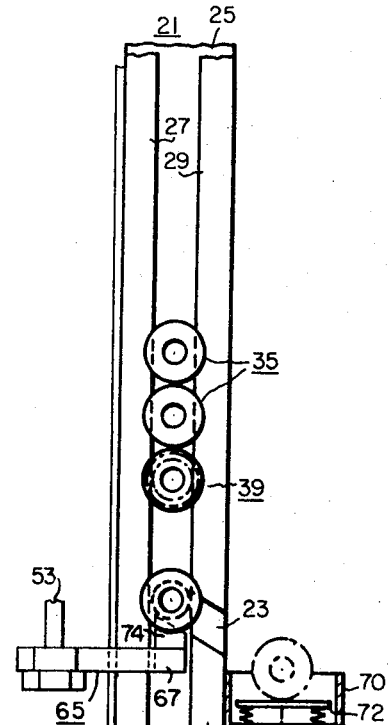
FIG.4c
FIG.5
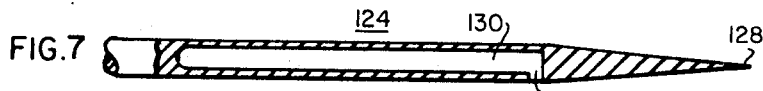
FIG.7
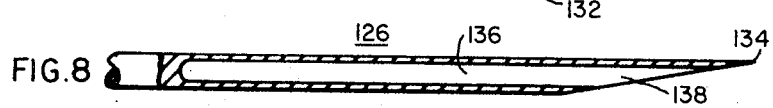
FIG.8
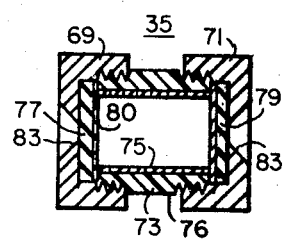
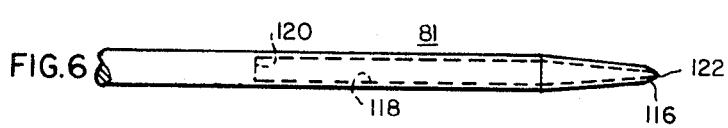
FIG.6
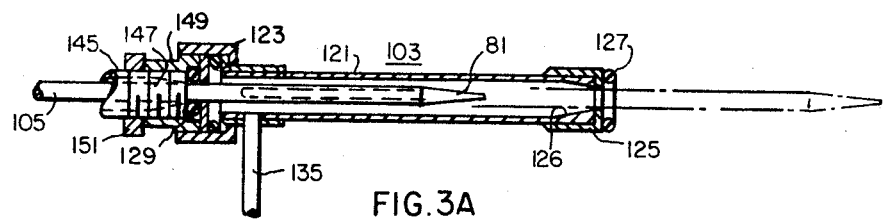
FIG.3A Patented Aug. 28, 1973

CHEMICAL ANALYSIS

BACKGROUND OF THE INVENTION

This invention relates to chemical analysis and has particular relationship to analysis of gases and vapors by gas chromatography and the like. Among the areas where this invention amy be advantageously applied are the analysis of gases in ecological studies to determine the extent of pollution of streams and the atmosphere and in the petroleum cracking industries to determine the composition of the various fractions. This invention lends itself readily to highly precise qualitative analysis where the presence of components in parts in a million or in ten million are to be detected.

In the analysis art, particularly in the areas mentioned, it is necessary that a large number of samples be analysed. In the interest of economic operation it is desirable that the samples be analyzed in large numbers automatically and it is an object of this invention to achieve relatively low-cost automatic analysis.

There are available facilities, such as gas chromotographs, in which the analytical cycle can be carried out automatically with good reliability. Automatic information-handling apparatus, such as recorders which produce readily usable chromatograms and the like, are also available. In addition, chromatographs and like analyzers can be connected to computers which automatically provide analysis of the input data. There are also automatic liquid samplers, as typified by Lightner et al. U.S. Pat. No. 3,550,543, but such samplers are highly complex in their operation and are difficult to operate so as to yield accurate results. This invention arises from the realization that such available facilities and apparatus can be integrated with automatic-sample injection to provide in a simple manner relatively low-cost accurate automatic analysis of a large number of samples. It is an object of this invention to overcome the difficulties of the prior art and to provide apparatus and a method for automatic injection of samples which shall yield highly accurate results and shall involve simple uncomplicated operation.

It is also an object of this invention to provide apparatus and a method for chemically analyzing in succession a number of samples. Other objects of this invention are to provide a sample holder and a sample-transfer device particularly suitable for use in such apparatus and the practice of such method.

SUMMARY OF THE INVENTION

In accordance with this invention there is provided a sample holder having an entrance self-sealable septum of neoprene or the like and an exit self-sealable septum. Each sample is confined in such a holder between the septums. There is also provided, in accordance with this invention, a sample-transfer device in the form of a hypodermic pipette having a chamber for holding the sample during transfer. The pipette is composed of a material of high thermal conductivity, for example, stainless steel. The chamber in the pipette is a blind longitudinal hole. In accordance with this invention the hole has a lateral opening for transfer, in and out, of the sample. The lateral hole has the advantage that it does not become clogged during repeated use of the pipette.

In the practice of this invention each of the samples to be analyzed is in a sample holder in liquid phase. The holders are advanced in succession each in its turn into, and set in, a position for test or analysis. With the sample holder held in this position the chamber in the hypodermic pipette is evacuated and the pipette is injected into the entrance septum. The sample is sucked into the chamber and then the pipette penetrates the exit septum and is injected into the inlet to the analysis device, for example, the gas chromatograph. The temperature of this inlet is maintained well above the vaporization temperature of the sample and is usually at a higher temperature than the remainder of the analysis device. The temperature of the latter is high enough to maintain the sample vaporized. The sample in the chamber is initially in part quickly vaporized, increasing the pressure in the chamber substantially so that the sample is spray-injected into the analysis device where it is completely vaporized and analyzed. Typically a chromatogram for the sample is produced in a recorder and this graph may be compared with a standard as to wave shapes, times of occurrence and the like to identify the components of the sample and their magnitudes. The data from the chromatograph can also be converted into digital magnitudes and fed into a computer; the computer may then carry out the necessary computation.

After injecting the sample into the analysis device, the pipette is retracted and is repeatedly heated to the vaporization temperature of the sample and evacuated to reduce the residue or "memory" of the injected sample in the chamber. At the same time the holder which has been processed is set in an intermediate position and the succeeding holder is set in test position and temporarily held in this position by the processed holder. Then the new holder is secured for processing and the processed holder ejected from the conveyor. A succeeding injection into the analyzing device is now automatically initiated.

The automatic processing of the samples may be effected in various ways. Typically the processing may be carried out at time intervals set by a timer. Or the computer which carries out the analysis may initiate the new process at an appropriate time in the analysis of the preceding sample. Or the new process may be initiated by the impact produced by the processed sample holder into the container for processed holders.

BRIEF DESCRIPTION OF THE DRAWINGS

For a better understanding of this invention, both as to its organization and as to its operation, together with additional objects and advantages thereof, reference is made to the following description taken in connection with the accompanying drawings, in which:

FIG. 1 is a view partly diagrammatic partly schematic and partly in side elevation of an embodiment of this invention;

FIG. 2 is a graph showing the operation of the sequencing unit of the apparatus shown in FIG. 1;

FIG. 3 is a view in side elevation showing the sample-transfer unit of the apparatus shown in FIG. 1, in its relationship to the sample-holder conveyor;

FIG. 3A is a fragmental view, enlarged, showing the cooperative relationship of the hypodermic pipette and its housing;

FIGS. 4a, 4b, 4c are like views in front elevation showing the gravity conveyor of the apparatus shown in FIG. 1, loaded with samples, in its successive position;

FIG. 5 is a view in section of a sample holder in accordance with this invention;

FIG. 6 is a fragmental view in side elevation of a hypodermic pipette of the sample-transfer unit of this invention;

FIG. 7 is a fragmental view in side elevation of a hypodermic pipette in accordance with this invention;

FIG. 8 is a fragmental view in side elevation of another hypodermic pipette in accordance with this invention;

DETAILED DESCRIPTION OF INVENTION

Figure 10A:
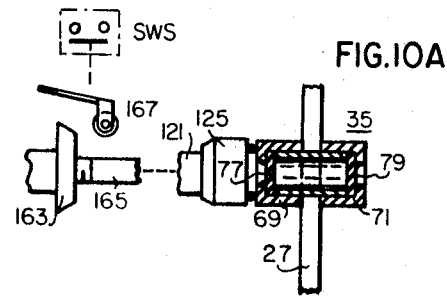
FIGS. 10a and 10b are fragmental views showing successive operations which produce a shut-down of the apparatus in the absence of a sample holder in the test position; and holder in said testing position and thereafter into said inlet, said chamber while passing through said entrance septum to said exit septum absorbing said substantially fixed volume of the sample from said last-named holder, and means for transferring said absorbed sample

The apparatus shown in the drawings includes a conveyor unit CN, typically of the gravity type, a sample analyzer A, typically a chromatographic system, a sample-transfer unit ST, a sequencing unit S, a control unit CO and a heating unit H. These units cooperate automatically to inject into the analyzer A a number of samples which are analyzed.

The conveyor unit CN (FIG. 3) includes a vertical track 21 with an exit slot 23 at the base. This unit CN has a mounting back plate 25 from which guide bars 27, 29, 31 (FIGS. 4a, 4b, 4c) defining the track 21 and ejection slot 23, are suspended by spacer studs 33. The adjacent edges of the bars 29 and 31 are bevelled to define the ejection slot 23. The sample holders 35 are stacked in the track 21. They may be inserted by hand or fed by a conveyor or from a suitably formed hopper. The sample 37 (FIGS. 9a, 9b) from each holder 35 in its turn is set in a test position 39 for injection into analyzer unit A.

The conveyor unit CN includes a mechanism 41 for holding the sample holders in the test position 39, in an intermediate position and in the holder-ejection position. This mechanism 41 (FIG. 4a) includes a pair of pneumatic cylinders 43 and 45 each having a piston 47 and 49 therein from which piston rods 51 and 53 extend. The cylinders 43 and 45 are interconnected and suspended vertically from a bracket 55 secured to the mounting plate 25. The cylinders 43 and 45 are joined by a ring 57 connected to a conductor 59 through which a fluid (for example air) is supplied in common to both cylinders producing pressure above the lower piston 49 and below the upper piston 47. Conductors 61 and 63 are also connected at the lower end of the lower cylinder 45 and at the upper end of the upper cylinder 43 to supply fluid below the piston 49 and above the piston 47. In the absence of air in any of the conductors 59, 61, 63 the pistons 47 and 49 remain in the last position where they are set.

A bifurcated (fork-like) member 65 is secured to the lower piston rod 53. The tines 67 of this member 65 extend through a slot 68 in support 55 and straddle the bar 27. A tongue 74 is secured between the tines 67 and extends upwardly and engages the neck 76 of a sample holder 35 and holds the holder in the position in which the member 65 is set. The engaging edge 78 of the tongue 74 is bevelled at the same angle as the walls of the ejection slot 23. The upper rod 51 is capable of extending into cylinder 45 and moving piston 49 downwardly but is physically disengageable from piston 49.

In the lowest position of the member 65 (FIG. 4c), each processed holder 35 is ejected by gravity through slot 23 into a container 70. The container 70 may include a resilient plate 72 which responds to the impact of the holder 35 dropping into container 70 to close the switch SW which may initiate a new injection cycle for the succeeding sample or condition a new ejection cycle to be initiated after analysis. In the interest of clarity the switch SW is shown in FIG. 1 remote from the container 70. In actual practice this switch SW would be directly under plate 72 and would be connected in the starting circuit 76 by wires 78.

The sample holder 35 (FIGS. 5, 9a) includes a hollow cylinder 73 of a material 75 such as tetrafluoroethylene or metal lined with glass 75. The cylinder 73 has an external thread on both ends. The heads 69 and 71 are screwed onto this thread. The ends of the cylinder 73 are closed by septums 77 and 79 which are composed of a material such as neoprene preferably coated with tetrafluoroethylene 80, and are self-sealable when penetrated by a hypodermic pipette 81. The septums 77 and 79 are held firmly by the heads 69 and 71 respectively. Each head has an opening 83 through which the pipette 81 may enter or exit. The septum 77 may be called an entrance septum and the septum 79 an exit septum.

Figure 11:
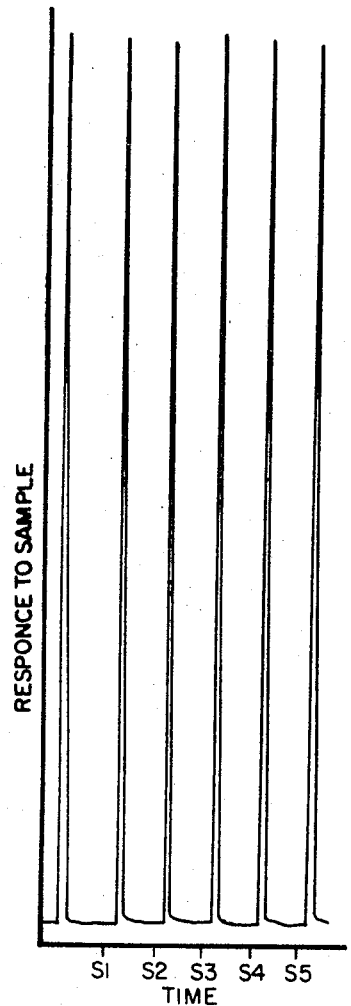
FIG. 11 is a reproduction of a chromatogram produced in successive analysis of the same material in the actual practice of this invention.
Figure 9A:
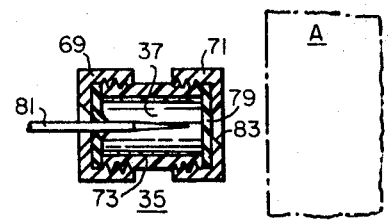
FIGS. 9a and 9b are fragmental views showing the successive cooperative positions of the sample holder and the pipette during a sample-transfer operation.
Figure 9B:
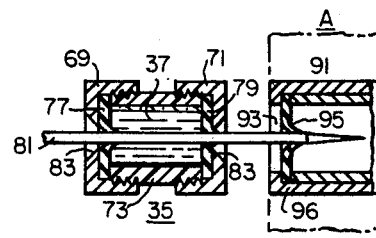

The analyzer unit A (FIG. 1) includes a chromatograph 91 having an inlet 93 which includes a self-sealable septum 95 held by a cap 96 (FIG. 9b). The unit also includes a heater 97 for heating the chromatograph to the vaporization temperature of the sample 37 and the inlet 93 to a higher temperature, and a recorder 99 for producing chromatograms as shown in FIG. 11. The chromatograph may feed data into a computer 101 (FIG. 1) which analyzes the data and provides desired information as to the material analyzed on a typewriter, cards or tape (all not shown). The computer 101 may control the start switch SW for the sequencer S.

The sample-transfer unit ST is supported on a base plate 102 secured to the plate 25 (FIG. 3). This unit ST includes in addition to the hypodermic pipette 81 a pipette holder or housing 103 in which the pipette 81 is movable. The pipette 81 is connected to a piston rod 105 which is driven by a piston 107 actuable by fluid in a cylinder 109 supported by bracket 113 secured to base plate 102. The cylinder 109 has fluid inlets 115 and 117 on both sides of the piston 107. Fluid supplied to inlet 115 actuates the pipette 81 to move towards the sample holder 35 in position 39; fluid supplied in inlet 117 retracts the pipette 81. In the absence of fluid in cylinder 109, the piston 107 and pipette 81 remain in the last position in which they are set.

The pipette 81 is in the form of a hypodermic needle with a point 116 capable of readily penetrating the septums 77, 79 and 95. Unlike a hypodermic needle, the pipette 81 has a blind hole or chamber 118. This hole is closed at 120 and, as shown in FIG. 6, it may terminate in an opening 112 at the point.

It has been realized, however, that, unlike a hypodermic needle used by doctors, the hypodermic pipette 81 is used repeatedly a high number of times in the practice of this invention. It has also been realized that the opening 112 of a pipette such as 81 may become clogged as it penetrates the septums or the liquid 37 and a large number of analyses may be carried out and samples rendered useless without any useful results.

In accordance with this invention, hypodermic pipettes 124 (FIG. 7) and 126 (FIG. 8) are provided in which the chambers open laterally. The pipette 124 of FIG. 7 has a conical or tapered point 128 and a chamber 130 which opens adjacent the start of the taper in an opening 132 generally at right angles to the chamber. The pipette 126 shown in FIG. 8 has a point 134 produced by a bevel and a chamber 136 which opens at an opening 138 along the bevelled wall.

The pipettes 81, 124, 126 each is cylindrical typically with a maximum outside diameter of 0.010 to 0.040 inches. The chamber or cavity volume may vary between 1/100 and 5 microliters or over a wider range.

The pipette housing 103 (FIG. 3A) is a hollow cylindrical tube 121 of stainless steel or the like with enlarged cylindrical ends 123 and 125. The end 125 is opposite the sample holder 35 in position 39 and has an opening through which the pipette 81 is injected into the holder 35 and the inlet 93. The inner wall of the tube 121 and end 125 taper as at 126 towards this opening so that the pipette 81 is centered as it passes out of the housing 103. The opening is enclosed by an O-ring 127 which is cemented onto the end 125 and serves to produce a compression seal when, in the operation of the apparatus, the housing is thrust into engagement with the head 69 of a sample holder 35 in test position 39. In the enlarged portion 123 the housing 103 has an O-ring 129 which engages the end of the pipette 81 remote from its point 130, or engages the drive rod 105 and seals the inside of the housing 103 against leakage as the pipette 81 is moved back and forth. The holder or housing 103 has terminals 131 and 133 (FIG. 1) for connection to the heater H and a tube 135, (FIG. 3A) extending from enlarged portion 123, for connection to a vacuum pump (not shown) so that the housing may be heated and exhausted. The heater H supplies electrical power to heat the tube 103; the heat is provided by $I^2R$ loss developed in tube 103.

The housing 103 is driven into and out of sealing engagement with the head 69 of each holder in position 39 by a piston 141 in cylinder 143 (FIG. 3). The piston 141 drives piston rod 145. Piston rod 145 is hollow to permit longitudinal movement of rod 105 and its opening is tapered at the end 147 (FIG. 3A) to center the rod 105 and pipette 81. Piston rod 145 terminates in a hollow threaded end 147 which is screwed into the stem 149 at the end 123 and may be secured by a lock nut (not shown). Cylinder 143 has inlet tubes 153 and 155 for fluid (air) on both sides of the piston 141 for supplying fluid to actuate the piston 141 in one or the other direction. In the absence of fluid in cylinder 143 the piston 141 remains in the position in which it was last set.

Figure 10B:
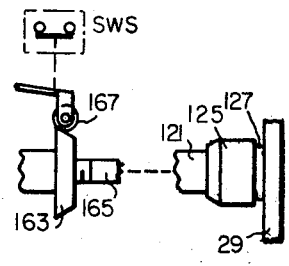

The sample transfer unit ST includes a shut-down mechanism 161 (FIGS. 10a, 10b) which operates to set the apparatus in standby and produce a visual or audible indication when there is no sample holder 35 in position 39. This mechanism 161 includes a cam 163 secured to an extension 165 from piston rod 145 and a cam follower 167. So long as there is a sample holder 35 in position 39, the movement of the cam 163 towards position 39 is limited and this cam does not engage the follower 167 (FIG. 10a). In the absence of a holder 35 in position 39, the cam moves further inwardly engaging and pivoting the follower (FIG. 10b) and closing a shutdown switch SWS which closes a shut-down network 169 (FIG. 1). This network assures that the last operation to be started is completed; then it sets the apparatus in standby and produces a signal. The shut-down switch SWS remains closed even after the electrical power to the apparatus is interrupted.

The sequence unit S includes cams a, b, c, d, e, f, g, h, i, j, each labeled to correspond to a graph of FIG. 2. The cams a through j are rotatable by a timer motor 170 and are fixed on the cam shaft 172 of this motor so that they rotate together. Each cam operates a follower 171a through 171j which in turn operates one of the switches 173, 175, 177, 179, 181, 183, 185, 187, 189, 191 of the control unit CO.

In FIG. 2 a graph is plotted for each cam a through j, the graphs being labeled to correspond to the cams. In each graph time is plotted horizontally and it is assumed that for all graph points vertically aligned; that is, at the same abscissa distance, represent the same instant during the rotation of the cams. For each graph the ordinate position labeled "OFF" corresponds to the retracted position of the follower and the open position labeled "ON", of the corresponding switch of CO, represents the extended position of the follower and the closed position of the corresponding switch.

The cams a through j are notched to produce the conditions shown in FIG. 2. Typically cam a has a reentrant notch (not shown) which normally retracts follower 171a so that switch 173 is open. Cam a then normally maintains switch 173 open as indicated by the label "OFF" of graph a of FIG. 2. The remainder of the periphery of cam a is such that the cam follower 171a is extended or moved outwardly to close switch 173 as indicated by the line at the level of "ON" of graph a (FIG. 2). The other cams b through j are similarly contoured to produce the settings "ON" at the appropriate instants, relative to cam a, as represented by graphs b through j of FIG. 2. The cams b through j have projections rather than notches producing the "ON" settings as shown in FIG. 2. The projections have the approximate lengths indicated in FIG. 2. The cams d, e, g, i, j, have a number of projections of the appropriate lengths indicated.

The control unit CO is actuable by the cams a through j and includes the fluid switches 175, 177, 179, 181, 183, 185, 187 and the electrical swtiches 173, 189, 191. The fluid switches 175 to 187 may be pneumatic microswitches controlling air flow and the electrical switches 173, 189, 191 may be electrical microswitches. The fluid switches control the flow of fluid from a source (not shown) through conductors 201 and 203. A pressure regulator 205 regulates the flow through conductor 201 through switches 179 to 187 and the volume flow through switches 175, 177, 179 and 181 is controlled by adjustable needle valves 207, 209, 211, 213.

Typically the fluid supplied to conductors 201 and 203 is air derived from a tank (not shown) having its own regulator through which air is supplied at about 50 pounds per square inch. Cylinder 109 and its piston 107 which drives the pipette 81 are of relatively small diameter, because the piston rod 105 must be of small enough diameter to pass through tubular rod 145 connected to housing 103. The meximum pressure available must then be applied to piston 107, and cylinder 109 is supplied directly from the tank through conductor 203, valves 207 and 209 and switches 175 and 177. The other cylinders 143, 43 and 45 require less pressure, operate at about 30 pounds per square inch and have their own regulator 205. Cylinder 143 is supplied through valves 211 and 213 and switches 179 and 181 and cylinders 43 and 45 directly through 187, 183, 185. The valves 207 and 209 and 211 and 213 control the volume of fluid flowing into the cylinders 109 and 143 and the speed of movement of the pipette or the housing.

The electrical switches are supplied from conductors or buses L1, L2 which may be the buses of an ordinary commercial supply. Switch 173 is connected across the starting switch SW, typically a push-button or microswitch type switch closed momentarily, and when closed by cam $a$ closes the supply circuit for timer motor 170 and holds it closed until follower 171a encounters the notch in cam $a$ and opens the circuit. Switch 189, when closed by cam $i$, connects the primary 221 of the heating transformer for housing 103 to buses L1 and L2. Switch 191, when closed by cam $j$, energizes solenoid 223 to open valve 225 and permit the pump (not shown) to evacuate the housing 103.

The starting circuit 76 operates to start an injection operation by connecting the timer motor 170 to buses L1 and L2 when closed by switch SW. SW may be closed by the impact when a used sample container 35 drops into box 70, by computer 99, by an independent timer control 227, which may be set to start injections at appropriate intervals, by a switch (not shown) controlled by the chromatograph 91, or by hand.

The heater H includes a step-down transformer capable of supplying high current having primary 221 and secondary 231. The secondary is connected in series with housing 103 and a shell 233 equal in its electrical resistance and thermal capacity to housing 103. The shell 233 may be located in the console for the apparatus. A thermocouple temperature indicator 235 is connected to shell 233. The temperature of housing 103 is substantially equal to the temperature of shell 233 and may be determined without affecting the operation of the housing 103 or pipette 81.

STANDBY

In the standby condition of the apparatus, switch SW is open and the timer motor 173 is deenergized with cam $a$ in the start position and switch 173 open. The other cams $b$ through $j$ are also in the start position and all switches 175 through 285 and 189 and 191 are open, the former conducting no fluid and the latter no electricity. Valve 225 is closed, primary 221 is deenergized and the pistons 107, 141, 47 and 49 are in the positions in which they were set at the end of the last operating cycle. The pipette 81 and the pipette housing 103 are fully retracted with the housing at room temperature and atmospheric pressure. Member 65 is raised to its uppermost position engaging a sample holder whose sample is to be injected in inlet 93.

OPERATION

The operation will be described with reference to FIG. 2. During standby, at zero time, all switches are in the "OFF" position as appears on the extrene left of graphs $a$ through $j$.

To start the operation switch SW is closed momentarily, starting motor 170. Motor 170 rotates the cams $a$ through $j$ and cam $a$ closes switch 173 to lock in the timer motor energizing circuit so that the motor 170 and cams continue to rotate.

The residue or memory from the injection of the prior sample is now reduced by flashing operations produced by the repeated opening and closing of switches 179, 181, 189 and 191 as shown on the left of graphs $d, e, i$ and $j$ of FIG. 2. After switch 173 is closed, switch 179 is closed and piston 141 is advanced so that O-ring 127 (FIG. 3A) is compressed against the sample holder 35 in position 39 sealing housing 103. Switch 189 is then closed and the primary 221 is energized and the housing heated to the vaporization temperature of the prior sample and the residue in the pipette 81 is vaporized. Switch 191 is closed and valve 225 is opened and housing 103 exhausted removing the vapor of the resiude. Switch 179 is now opened and switch 181 closed retracting piston 141 and breaking the seal formed by O-ring 127 and admitting atmospheric air into tub 103. Switches 189 and 191 are opened to deenergize secondary 221 and close valve 225. Then the seal is again formed and switches 189 and 191 closed to again evaporate the residue and evacuate. By the admission of the air on the breaking of the seal the residue vapor is diluted to an amount determined by the difference between the pressure following evacuation and atmospheric pressure. If the vacuum pressure is 1 mm. of mercury the reduction is by a factor of about 760; that is, the residue is reduced nearly 1/1000 during each repetition of sealing, heating and evacuation. FIG. 2 shows two such flashing operations but any reasonable number may be carried out by proper contouring of the cams $a$ through $j$. For two operations, the first reduces the memory or residue to about 1 part in 200,000 and the second to about 1 part in 200 million.

With the residue reduced the sample 37 is now sucked into pipette 81 from the holder 35 and injected into the chromatograph 91. For this purpose, switch 179 is closed urging the housing 103 into sealing engagement with the holder 35 (long "ON" interval FIG. 2d). Also, switch 191 is closed to open valve 225 and evacuate the housing 103 (graph j, long "ON"). The pump (not shown) remains connected to the housing 103.

While the pump is connected and the housing 103 remains evacuated, switch 175 is closed (graph b) and the pipette 81 is injected through septum 77 (FIG. 9a). The pipette 81 continues to be moved through sample 37 and is moved at such a speed as to suck in the sample 37 to its capacity. Thereafter, the pipette 81 is moved through septums 79 and 95 into inlet 93. The chromatograph 91 is heated by heater 97 to an inlet temperature such that the sample is rapidly vaporized producing pressure within chamber 118 (or 130, 136) to spray deposit the sample into the chromatograph. The chromatographic analysis of the sample now proceeds.

A typical sample has a molecular weight of approximately 100, a liquid density of the order of 0.7 gms/ml and boiling between 150°–175°C. In this case the chromatograph inlet 93 should normally be operated near 200°C.

Typically a pipette 81 has a liquid volume of one microliter. The gas volume is then approximately 272 microliters at the injector temperature. Of this 272 microliter gas-phase sample, one microliter remains in the pipette 81; this is approximately 0.37 percent. Since the temperature is rapidly brought above the boiling point of all components the gas phase sample remaining has a negigible difference in composition from the original sample. Thus, more than 99½ percent of the sample 37 is cleanly injected in such a manner as to bring about rapid vaporization and no change in composition.

After injection of sample 37, switch 175 is opened and switch 177 closed (graph c short "ON"); piston 107 and pipette 81 are retracted. The housing 103 remains sealed (graph d).

After the pipette 81 is retracted switch 179 is opened and switch 181 closed (graph e) and the seal to sample holder 35 is broken and housing 103 retracted.

Switch 187 is now closed (graph f) and member 65 is displaced to the intermediate position. Member 65 carries the used sample holder 35 to the ejection position and holds it there (FIG. 4b). A new holder 35 replaces the used holder in position 39 and is held there by the used holder 35. (FIG. 4b).

Switch 179 is now again closed (graph d, right-hand "ON"). Housing 103 is then brought into sealing engagement with the new holder.

Switch 187 is now opened and switch 183 closed (graph h) switch 185 being open, and the member 65 is brought to the lowest position (FIG. 4c) and the used sample holder is ejected into container 70.

Switch 183 is opened and switch 185 closed (graph g) and, switch 187 being open, member 65 is raised to its uppermost position supporting the new sample holder 35 in position 39.

Switch 179 is opened and switch 181 closed (graph e) and the housing 103 is retracted.

Switch 173 is opened (graph a, right) and timer motor 107 is deenergized setting the apparatus for a succeeding operation.

Typical of the reliability of the analysis provided in the practice of this invention is FIG. 11 which is the reproduction of a chromatogram actually produced by the recorder 99 of the appratus. The record was produced with like samples 37 of N-Heptane. The chromatograph 91 was a column of Carbowax 20 M 6 feet long and one-eighth inch in diameter. The injection inlet 93 was heated to about 200°C. and the column to 150°C. The quantity of sample injected was 1 microliter.

In FIG. 11 time is plotted horizontally and the response of the recorder 99 vertically. The heights of the peaks (and areas under them) measure the quantity of N-Heptane in the sample. As shown the heights for different peaks differ by less than 1 percent. The peaks occur at equal intervals. This establishes that the samples have passed through the chromatograph column in the same time interval after injection and correspond to the same chemical substance.

While certain embodiments of this invention have been disclosed herein, many modifications thereof are feasible. This invention is not to be restricted except insofar as is necessitated by the spirit of the prior art.

I claim:

1. Apparatus for successive analysis of a plurality of samples of material, each sample contained in a sample holder having an entrance self-sealable septum and an exit self-sealable septum, the said apparatus including a conveyor for advancing a plurality of said holders each in succession through a testing position, sample-transfer means having a chamber of substantially fixed volume for storing the sample during transfer, sample analysis means having an inlet, means connected to said sample-transfer means for preconditioning said chamber to absorb said sample, means for moving said sample-transfer means and a holder in said test position relative to each other so that said chamber while so preconditioned passes through the entrance septum, and then through the exit septum of a holder, and means for transferring said absorbed sampl to said sample-analysis means through said inlet when said chamber has passed through said exit septum into said inlet.

2. The apparatus of claim 1 for analysis of a sample that is in liquid phase below a predetermined temperature and in gas phase above said temperature, said sample being maintained below said temperature in the holder in the test position; the means for transferring the absorbed sample including means for maintaining said sample in the chamber above above temperature only after the chamber enters the inlet.

3. The apparatus of claim 2 wherein the maintaining means maintains the sample substantially above the temperature so that the sample is rapidly vaporized and enters the sample-analysis means in a spray pattern.

4. The apparatus of claim 1 wherein the conveyor is a gravity conveyor in which the sample holder in the test position is oriented with the septums verticle, and the sample-transfer means includes a hypodermic pipette having a point and having the chamber therein, and the moving means includes means for producing substantially horizontal linear motion of said pipette relative to the holder in the test position, and the conveyor includes means for positioning the holder in the test position with the entrance septum and the exit septum generally transverse to the movement of the pipette so that the point penetrates the entrance septum and the exit septum in succession during the relative motion of the pipette and the last-named holder.

5. The apparatus of claim 1 including means, connected to the sample-transfer means, for reducing the quantity of residue in the chamber of the sample last absorbed in the chamber prior to the preconditioning of the chamber by the preconditioning means.

6. The apparatus of claim 5 wherein the residue-reducing means includes means operating in succession to:
   a. vaporize the said residue,
   b. exhaust the chamber to remove the said vapor of said residue,
   c. then raise the pressure of said chamber, then repeating said steps (a), (b) and (c) to reduce the residue left after the first succession of steps (a), (b) and (c).

7. The apparatus of claim 1 wherein the entrance and the exit septums of each sample holder are internally coated with a chemically inert material.

8. The apparatus of claim 1 wherein the preconditioning means for the chamber includes means for evacuating said chamber, and wherein the moving means for the sample-transfer means includes means for maintaining the vacuum in said chamber after the chamber passes through the exit septum, whereby the sample passes from the holder into the chamber under the difference between the pressure in the sample and the reduced pressure in the chamber.

9. The apparatus of claim 8 wherein the sample-transfer means has an enclosure within which the chamber is contained prior to its injection into the holder, and the sample-transfer means also includes means connected to said enclosure for engaging a sample holder in the test position in substantially pressure-tight sealing relationship when said sample-transfer means and sample holder are moved relative to each other so that the chamber passes through the entrance septum, to seal said enclosure during preconditioning of the chamber and subsequent injection into the holder.

10. The apparatus of claim 1 wherein the chamber is a hypodermic pipette with a blind hole therein, the chamber extending longitudinally along the pipette from the hole.

11. The method of analyzing in succession a plurality of samples of material each contained in a sample holder which holder includes an entrance self-sealable septum and an exit self-sealable septum, with apparatus including sample-transfer means having a chamber of substantially fixed volume for storing a sample, and sample-analysis means having an inlet, the said method comprising positioning each sample-holder in its turn in a test position, preconditioning the chamber to absorb a sample, actuating said sample-transfer means to inject said chamber into said last-named sample holder through its entrance septum, while the chamber is preconditioned, and absorbing the said fixed volume of sample from said sample holder into said chamber, actuating said sample transfer means to pass said chamber with the sample therein through said exit septum and inject said chamber into said inlet, and transferring the sample in said chamber from said chamber to said sample-analysis means.

12. The method of claim 11 wherein the chamber is preconditioned to absorb a sample by reducing the pressure in the chamber before the chamber is injected into the sample holder, maintaining the pressure in the chamber reduced after the chamber is injected into the sample holder, whereby the sample is absorbed into the chamber under the excess of pressure in the sample over the reduced pressure in chamber.

13. The method of claim 11 wherein prior to the preconditioning of the chambers, the residue of sample in the chamber from the prior transfer of sample is reduced to a small magnitude.

14. The method of claim 11 wherein the sample-transfer means includes a housing containing the chamber in the unactuated condition of said sample-transfer means, the said housing having an opening therein through which the chamber is injected through the entrance septum, the said method including the steps of engaging said housing with the sample holder in the test position to seal said housing substantially pressure tight, preconditioning the chamber by exhausting the housing, the chamber therein being exhausted as the housing is exhausted and injecting the chamber into the entrance septum while the housing is sealed whereby the chamber absorbs the sample under the pressure difference in the sample and in the housing.

15. Apparatus for automatic successive analysis of samples each contained in a sample holder having a penetrable wall, the said apparatus including means automatically repeatedly operable for advancing said holders in succession into, and setting each in its turn, in a test position, sample-transfer means, sample-analysis means, means for automatically repeatedly actuating said sample-transfer means successively into engagement with the walls of successive sample holders as they are set in said position, means for actuating said sample-transfer means while in such engagement with each said holder to penetrate said wall and to transfer the sample in each said holder to said sample analysis means and for thereafter retracting said sample-transfer means from said engagement, and means responsive to said engaging movement of said sample-transfer means in the absence of a holder set in said test position for setting the said apparatus in non-testing condition to interrupt the said automatic repeated operation and actuation.

16. The apparatus of claim 15 wherein the sample-transfer means includes temporary sample-holding means having a generally longitudinal chamber for holding a sample to be transferred, said temporary sample-holding means being movable, on actuation of said sample-transfer means, into sample-receiving communication with the sample holder in the test position, said chamber being generally along the direction in which the temporary sample-holding means is so moved, said temporary sample-holding means having an opening lateral of said direction for transferring a sample from said last-named holder in the test position into the said chamber.

17. The apparatus of claim 16 wherein the sample-transfer means includes a sealable hollow holder for the temporary sample-holding means with the chamber and the opening in communication with the interior of said sealable holder, the sample-transfer means also including means for exhausting the interior of said holder and the chamber.

18. The method of analyzing in succession a plurality of samples of material, each sample contained in a sample holder, with apparatus including a gravity conveyor for advancing a plurality of holders under gravity, said conveyor including means for holding each holder in succession in a processing position and in an intermediate position whence it is ejectable by gravity on disengagement of said holding means, the said apparatus also including sample-transfer means; the said method comprising the steps of a. causing said holding means to hold a sample holder in the processing position, said last-named holder preventing movement under gravity of the holders above it;

b. causing said sample-transfer means to engage said holder in the processing position and to absorb the sample therefrom;

c. causing said sample-transfer means to disengage said holder in the processing position;

d. causing said holding means to hold said last-named holder in the intermediate position permitting a succeeding holder to move into the processing position, said holder in the intermediate position preventing movement under gravity of the holders above it;

e. causing said sample-transfer means to engage said succeeding holder and hold it in the processing position;

f. disengaging said holding means from said holder in the intermediate position ejecting said last-named holder;

g. causing said holding means to hold said succeeding holder in the processing position; and h. disengaging said sample-transfer means from said succeeding holder, said last-named holder preventing movement under gravity of the holders above it.

* * * * *